(12) United States Patent
Han

(10) Patent No.: US 9,612,116 B2
(45) Date of Patent: Apr. 4, 2017

(54) GYROSCOPE WITH ENCASED ANNULAR ROTARY CORE

(75) Inventor: Man-Yop Han, Yongin-si (KR)

(73) Assignee: INCT CO., LTD., Seoul (KR)

( * ) Notice: Subject to any disclaimer, the term of this patent is extended or adjusted under 35 U.S.C. 154(b) by 214 days.

(21) Appl. No.: 13/980,907

(22) PCT Filed: Jan. 20, 2012

(86) PCT No.: PCT/KR2012/000561
§ 371 (c)(1),
(2), (4) Date: Jul. 22, 2013

(87) PCT Pub. No.: WO2012/102536
PCT Pub. Date: Aug. 2, 2012

(65) Prior Publication Data
US 2013/0305823 A1    Nov. 21, 2013

(30) Foreign Application Priority Data
Jan. 25, 2011  (KR) ........................ 10-2011-0007491

(51) Int. Cl.
*G01C 19/02* (2006.01)
*G01C 19/08* (2006.01)
(52) U.S. Cl.
CPC ............. *G01C 19/02* (2013.01); *G01C 19/08* (2013.01)
(58) Field of Classification Search
CPC ...... G01C 19/02; G01C 19/08; G01C 19/025; G01C 19/04; G01C 19/06; G01C 19/065; G01C 19/10; G01C 19/16; G01C 19/18; F16C 32/0404

USPC ............ 73/504.08; 310/156.37–156.38, 262
See application file for complete search history.

(56) References Cited

U.S. PATENT DOCUMENTS

| | | | | |
|---|---|---|---|---|
| 796,893 | A * | 8/1905 | Brennan | B62K 11/04 |
| | | | | 105/141 |
| 2,662,411 | A * | 12/1953 | Lundberg et al. | 74/5.47 |
| 2,753,718 | A * | 7/1956 | Howe | 74/5.6 R |
| 2,978,793 | A * | 4/1961 | Lamson | F16C 33/6696 |
| | | | | 29/898.1 |
| 3,061,805 | A * | 10/1962 | Brodersen | 336/135 |

(Continued)

FOREIGN PATENT DOCUMENTS

| | | |
|---|---|---|
| JP | 09-200985 A | 7/1997 |
| JP | 11-142154 A | 5/1999 |

(Continued)

OTHER PUBLICATIONS

Spry et al, Gyroscopic Stabilization of Unstable Vehicles: Configurations, Dynamics, and Control, Mar. 31, 2008.*

*Primary Examiner* — Harshad R Patel
*Assistant Examiner* — David L Singer
(74) *Attorney, Agent, or Firm* — Enshan Hong; VLP Law Group LLP

(57) ABSTRACT

The present invention relates to a gyroscope. Particularly, a ring-shaped rotary core in which magnetic bodies and non-magnetic bodies are alternately arranged is provided to simplify the structure of the gyroscope and reduce the weight of the gyroscope. Also, due to reduced frictional resistance, noise can be minimized, and the speed at which the gyroscope rotates is markedly increased. As necessary, the gyroscope may be disposed within a sealed container to minimize a frictional loss and improve energy efficiency.

7 Claims, 4 Drawing Sheets

(56) References Cited

U.S. PATENT DOCUMENTS

| | | | |
|---|---|---|---|
| 3,475,971 A * | 11/1969 | Binder et al. ................ 74/5.6 R |
| 3,480,811 A * | 11/1969 | Grosbard ............ F16C 32/0404 |
| | | | 310/156.38 |
| 3,639,817 A * | 2/1972 | Grosbard ............... H02K 57/00 |
| | | | 310/156.01 |
| 3,915,416 A * | 10/1975 | Anderson ................ B64G 1/28 |
| | | | 244/165 |
| 4,065,189 A * | 12/1977 | Sikorra ............... F16C 32/0446 |
| | | | 244/166 |
| 4,269,073 A * | 5/1981 | McIntyre ........................ 74/5.7 |
| 4,278,927 A * | 7/1981 | Grohe .......................... 318/721 |
| 4,283,959 A * | 8/1981 | Strittmatter et al. ............ 74/5.7 |
| 5,017,519 A * | 5/1991 | Morimoto et al. ................ 501/7 |
| 2009/0243424 A1* | 10/2009 | Watanabe et al. ..... 310/216.109 |
| 2013/0101846 A1* | 4/2013 | Hinrichsen et al. .......... 428/389 |

FOREIGN PATENT DOCUMENTS

| | | |
|---|---|---|
| JP | 2003-182972 A | 7/2003 |
| JP | 2004-056897 A | 2/2004 |
| JP | 2006-147036 A | 6/2006 |

\* cited by examiner

GYROSCOPE WITH ENCASED ANNULAR ROTARY CORE

PRIORITY CLAIM

This is a U.S. national stage of application No. PCT/KR2012/000561, filed on Jan. 20, 2012. Priority is claimed on the following application: Country: Korea, Application No.: 10-2011-0007491, Filed: Jan. 25, 2011; the content of which is incorporated here by reference.

TECHNICAL FIELD

The present invention relates to a light and low-noise gyroscope which rotates at high speed using a principle of electromagnetically induced electromotive force.

This application claims the benefit of Korean Patent Application No. 10-2011-0007491, filed on Jan. 25, 2011, which is hereby incorporated by reference in its entirety into this application.

BACKGROUND ART

Gyroscopes are devices which use inertia of a rotary body that is rotating at high speed based on the law of conservation of angular momentum and have been used for a long time in a variety of fields. When a mass is rotating at high speed, even if force to change the orientation of a rotary body is applied thereto, the orientation of the axis of the rotary body is maintained in the original state rather than being changed, because, according to the law of conservation of angular momentum, force of resistance to variation in the orientation of the axis of the rotary body becomes much larger than when the body is not rotating.

Conventional gyroscopes are classified into a gyroscope which uses vacuum as rotational drive force, and a gyroscope which uses an electric motor as a drive source.

In a gyroscope using vacuum, a rotary body is provided with blades so that a mass of the gyroscope is rotated by the flow of air. Due to an advantage of a simple structure, the gyroscope using vacuum is mainly used in a small measuring instrument. This gyroscope is configured in the same manner as the other kind of gyroscope, that is, in such a way that it is supported by a gimbal which is an external support. However, in the case of the gyroscope using vacuum, in consideration of rotation of the gyroscope relative to the external gimbal, it is difficult to arrange a vacuum hose line which extends to the outside. Further, an external vacuum pump is essentially required.

In a gyroscope using an electric motor, a disk-shaped rotary body has a rotating shaft. The rotating shaft may be directly connected to the electric motor or be connected thereto through a speed-up gear unit to increase the rotational speed. In the same manner as the other kind of gyroscope, a rotating shaft of a rotating mass is supported by an external gimbal which is provided so as to be rotatable.

However, this structure requires a motor for rotating a gyroscope, and wheels are perpendicular to each other. Therefore, the volume and weight of the gyroscope are increased. Moreover, much noise is generated, and a loss of energy is very large due to air friction. Also, it is complex to arrange an external electric power supply wire.

In the past, it was common for gyroscopes using rotational inertia to be used in measuring instruments. Nowadays, the use of conventional gyroscopes using rotational inertia is becoming less common, because measuring instruments such as heading indicators, which are more precise and inexpensive and use laser or micro-electro circuits, have been developed and used.

Furthermore, for many years, attempts have been made to develop techniques to install gyroscopes in ships and use them for the purpose of reducing wobbling of the ships. However, recently, gyroscopes are seldom used even in ships. There has been no attempt to use a gyroscope in an aircraft or an automobile.

The reason why gyroscopes cannot be used in transportation means other than ships is due to the fact that physical inertia force of the gyroscopes must be further increased to achieve their intended purpose. That is, to increase inertia force of a gyroscope, a rotating mass must be formed to be heavier, or the speed at which the rotating mass rotates must be increased. As a result, there are various problems including an increase in weight, an increase in space required to install the gyroscope, generation of noise resulting from high-speed rotation, difficulty in continuous supply of energy, a loss of energy, etc.

DISCLOSURE

Technical Problem

Accordingly, the present invention has been made keeping in mind the above problems occurring in the prior art, and an object of the present invention is to provide a light and low-noise gyroscope which rotates at high speed using a principle of electromagnetically induced electromotive force, and application examples using the same.

Technical Solution

In order to accomplish the above object, in an embodiment, the present invention provides a gyroscope including: a rotary core having an annular shape and configured in such a way that magnetic bodies and nonmagnetic bodies are alternately arranged; a tube casing forming an annular space therein and receiving the rotary core in the annular space; a plurality of coils wound around the tube casing and disposed at positions spaced apart from each other at regular intervals; a power supply supplying current to the coils; and a controller controlling the power supply.

In another embodiment, the present invention provides a gyroscope including: a rotary core having an annular shape and configured in such a way that magnetic bodies and nonmagnetic bodies are alternately arranged; a plurality of coils wound around the rotary core with a space between each of the coils and the rotary core, the coils being disposed at positions spaced apart from each other at regular intervals; a power supply supplying current to the coils; and a controller controlling the power supply.

The gyroscope may further include a tube casing forming an annular space therein and receiving the rotary core and the coils in the annular space.

In each embodiment, each of the magnetic bodies of the rotary core may be made of a permanent magnet or wrought iron.

In each embodiment, the annular space may be sealed and is in a vacuum.

Advantageous Effects

Compared to the conventional gyroscope, a gyroscope according to the present invention has a simple structure, whereby the weight of the gyroscope is reduced, and the production cost thereof can also be reduced. Furthermore, the gyroscope of the present invention rotates under vacuum conditions, thus minimizing generation of noise. In addition, because frictional resistance is reduced, energy consumption can be minimized. As a result, the rotational speed can be markedly increased to a very high speed of 100,000 rpm or more which is much higher than the 20,000 rpm of the conventional technique. As such, the gyroscope of the present invention is capable of high performance related to inertia force, despite having a reduced weight.

DETAILED DESCRIPTION OF THE DISCLOSURE

The present invention may be embodied in many different forms, and should not be construed as being limited to the embodiments set forth herein. Rather, all changes that fall within the bounds of the present invention, or the equivalence of the bounds are therefore intended to be embraced by the present invention.

Figure 1:
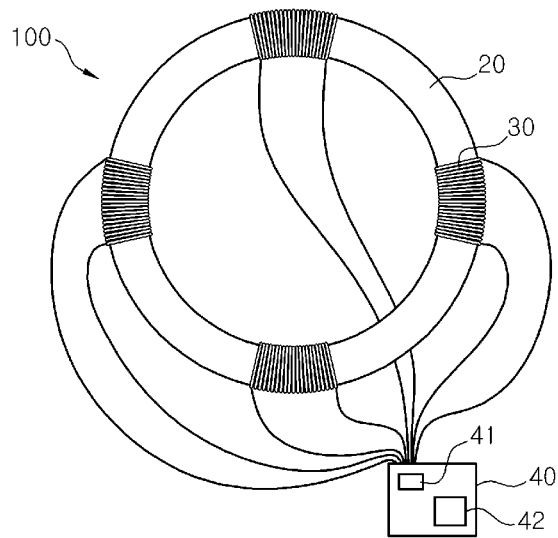
FIG. 1 is a plan view illustrating a gyroscope according to an embodiment of the present invention.
Figure 2:
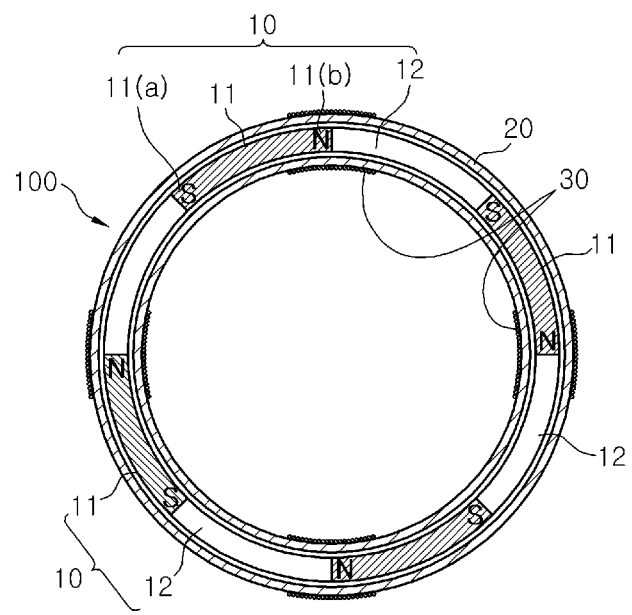
FIG. 2 is a plan sectional view of the gyroscope of FIG. 1.
Figure 3:
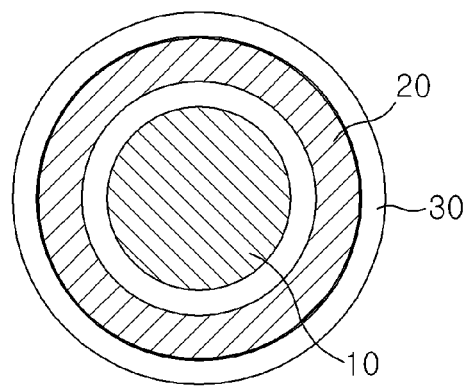
FIG. 3 is a cross-sectional view of the gyroscope of FIG. 1.

Hereinafter, a gyroscope according to the present invention will be described with reference to FIGS. 1 through 3. FIG. 1 is a plan view illustrating a gyroscope 100 according to an embodiment of the present invention. FIG. 2 is a plan sectional view of the gyroscope 100 of FIG. 1. FIG. 3 is a cross-sectional view of the gyroscope 100 of FIG. 1.

The gyroscope 100 according to the embodiment of the present invention includes a tube casing 20 which defines an annular space therein, an annular rotary core 10 which is disposed in the annular space of the tube casing 20 and is rotated in the annular space, a plurality of coils 30 which are metal wires wound around the tube casing 20 and are arranged on the tube casing 20 at positions spaced apart from each other at regular intervals and a control unit 40 which controls the gyroscope 100 according to the embodiment of the present invention.

Unlike the conventional mechanical gyroscope, in the gyroscope 100 according to the embodiment of the present invention, the rotary core 10 is rotated by applying current to the coils 30 using a principle of electromagnetic induction rather than by means of a motor.

The term "induced electromotive force" is electromotive force generated on a conductor in a magnetic field which varies with time or on a conductor which moves in a magnetic field. When current is applied to a wound metal wire, an electric field and a magnetic field are formed by transfer of electrons. In such an electric field and a magnetic field, force is applied to a magnetic body such as a permanent magnet or a magnetic wrought iron. This force is referred to as Lorentz's force. In the present invention, the rotary core 10 can be rotated by this force.

As shown in FIG. 2, the rotary core 10 is configured in such a way that magnetic bodies 11 and nonmagnetic bodies 12 alternate with each other. As stated above, the magnetic body 11 comprises a permanent magnet or a metal such as wrought iron. Although it is preferable that a permanent magnet is used as a rotary body which is rotated in response to a magnetic field induced by a coil, a material such as wrought iron which can induce magnetic force may be used because there is no problem in rotating the internal rotary core.

The rotary core 10 has an annular shape and is configured such that the magnetic bodies 11 alternate with the nonmagnetic bodies 12. The reason why the magnetic bodies 11 and the nonmagnetic bodies 12 are alternately arranged is due to the fact that, if the internal rotational body includes only the magnetic body 11, attractive force and repulsive force cannot be alternately applied between the magnetic body 11 and the magnetic force induced by the coils 30 provided around the magnetic body.

Referring to FIG. 3, although the rotary core 10 and the tube casing 20 are illustrated as having circular cross-sections, the present invention is not limited to this structure. In other words, depending on a cross-sectional shape of the internal space of the tube casing 20 which receives the rotary core 10 therein, the rotary core 10 and the tube casing 20 may have a variety of cross-sectional shapes, for example, an elliptical shape, a rectangular shape, a triangular shape, a peanut shape, etc., rather than being limited to having a circular cross-section.

The number of magnetic bodies 11 and nonmagnetic bodies 12 may be changed depending on the use purpose, size, etc. of the gyroscope 100. Since the magnetic bodies 11 and the nonmagnetic bodies 12 alternate with each other, the number of magnetic bodies 11 is the same as the number of nonmagnetic bodies 12. The size of each magnetic body 11 or each nonmagnetic body 12 does not have to be constant.

An embodiment in which a permanent magnet is used as the magnetic body 11 is illustrated in FIG. 2. The magnetic bodies 11 are arranged such that S-poles 11a and N-poles 11b thereof are oriented in the constant direction.

The tube casing 20 is an annular element, for example, formed by integrally connecting opposite ends of a hollow tube to each other such that an internal annular space is defined by the tube. The rotary core 10 is disposed in the internal annular space. The tube casing 20 is formed such that the size of the internal annular space is slightly larger than that of the rotary core 10, because the rotary core 10 must be able to rotate in the internal annular space.

To minimize frictional force generated when the rotary core 10 rotates, the tube casing 20 may be surface-treated so that the friction factor of the surface of the internal space of the tube casing 20 can be reduced, or the internal space may be a vacuum.

Particularly, if the internal space of the tube casing 20 is made vacuum, noise is prevented from being generated, and a loss of energy attributable to air friction is prevented, whereby energy efficiency can be enhanced.

Although it is preferable that the internal space of the tube casing 20 is made vacuum, it is not limited to the vacuum structure. In other words, even if the internal space of the tube casing 20 is not in the vacuum state, there is no problem in rotating the rotary core 10 in the same operational principle so long as the rotary core 10 and the coils 30 which will be explained later herein are spaced apart from each other and the rotary core 10 is configured such that it can be rotated by current that flows through the coils 30.

The tube casing 20 may be made of nonmagnetic material such as plastic so as to prevent it from interfering with lines of magnetic force and lines of electric force. Alternatively, the tube casing 20 may be made of material such as iron or the like which is capable of magnetic induction to reinforce lines of magnetic force. The tube casing 20 is coupled to a gimbal, which is provided so as to be rotatable in a direction perpendicular to a rotating axis of the rotary core 10, and is fixed to a transportation means or a measuring instrument.

The coils 30 are metal wires which are wound around the rotary core 10 and disposed at positions spaced apart from each other at regular intervals. As shown in FIG. 1, in the case when the rotary core 10 is received in the tube casing 20, the coils 30 are wound around the tube casing 20. In other words, as shown in FIG. 1, the several coils 30 are arranged at regular intervals and wound around the tube casing 20 in response to the annular shape of the rotary core 10 and the tube casing 20.

The number of coils 30 may be the same as the number of magnetic bodies 11 of the rotary core 10 or the number of nonmagnetic bodies 12. As necessary, the number of coils 30 may be greater or less than that of magnetic bodies 11 or nonmagnetic bodies 12.

When current flows through the coils 30, an electric field and a magnetic field are generated by transfer of electrons. Thereby, force is applied to the rotary core 10 which is a magnetic body. Here, the rotational speed and a rate of increase in rotational speed of the rotary core 10 can be controlled by adjusting the intensity and frequency of current applied to the coils 30

The control unit 40 is a device which controls the rotational speed, a rate of increase in rotational speed and a final rotational speed of the gyroscope 100. The control unit 40 comprises a power supply 41 which applies current to the coils 30, and a controller 42 which functions to control the supply of current, the intensity of current, frequency, the direction of current, etc.

Figure 4:
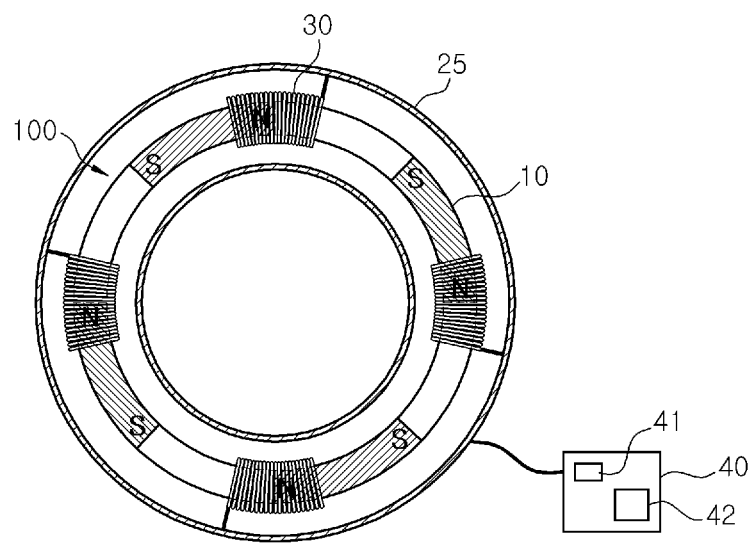
FIG. 4 is a plan sectional view illustrating a gyroscope, according to another embodiment of the present invention.

FIG. 4 is a plan sectional view illustrating a gyroscope 100, according to another embodiment of the present invention. The gyroscope 100 according to this embodiment comprises a rotary core 10, coils 30, a tube casing 25 which has an internal receiving space that receives the rotary core 10 and the coils 30, and a control unit 40 which controls the elements.

The rotary core 10 is an annular element configured in such a way that magnetic bodies and nonmagnetic bodies alternate with each other. The structure of the rotary core 10 of this embodiment is the same as that of the rotary core 10 of the previous embodiment, therefore its further explanation is deemed unnecessary.

The coils 30 are metal wires which are wound around the rotary core 10 and disposed at positions spaced apart from each other at regular intervals. In detail, as shown in FIG. 4, the several coils 30 are arranged at regular intervals and wound around the rotary core 10 in response to the annular shape of the rotary core. Unlike the previous embodiment in which the tube casing is disposed between the rotary core 10 and the coils 30, the coils 30 are wound around the rotary core 10 with space between the rotary core 10 and the coils 30 such that the rotary core 10 rotates in such a way as to pass through the coils 30. One end of each coil 30 is supported by the tube casing 25.

Furthermore, unlike the tube casing 20 of the previous embodiment, the tube casing 25 receives both the rotary core 10 and the coils 30 in the internal space thereof. The tube casing 25 protects the rotary core 10 which rotates in the internal space of the tube casing 25. The internal space of the tube casing 25 is made vacuum so as to minimize frictional force and reduce noise. The other characteristics of the tube casing 25 are similar to those of the tube casing 20 of the previous embodiment, therefore further explanation will be omitted.

The function of the control unit 40 of this embodiment that adjusts current flowing through the coils 30 to control the operation of the gyroscope 100 is the same as that of the control unit 40.

The gyroscope of the present invention has a simple structure, compared to the conventional gyroscope, so that the weight of the gyroscope can be reduced. Furthermore, due to reduced frictional resistance, the gyroscope of the present invention can reduce energy consumption, minimize noise, and markedly increase the rotational speed. Therefore, the gyroscope of the present invention can obtain large inertial force despite having a comparatively small weight Therefore, the gyroscope of the present invention can be used even in a transportation means such as an aircraft which requires as light weight as possible, a small transportation means such as an automobile, or different kinds of measuring instruments which have been able to use the conventional gyroscope because it was large, complex and heavy. Furthermore, the gyroscope of the present invention does not use a motor to rotate a rotor, unlike the conventional gyroscope in which the motor directly rotates the rotor. Thus, there is no problem of generation of noise, and energy efficiency can be enhanced, whereby the gyroscope of the present invention is very useful in many fields.

For example, among aircrafts, in the case of a vertical take-off and landing craft, it is very important and difficult to maintain the craft body level when taking off or landing. The conventional technique has used a method in which a computer automatically controls inlets and outlets of jet engines to maintain the craft body level when taking off or landing. However, in the conventional method, it is very difficult to always stably maintain the balance of the craft body.

Figure 5:
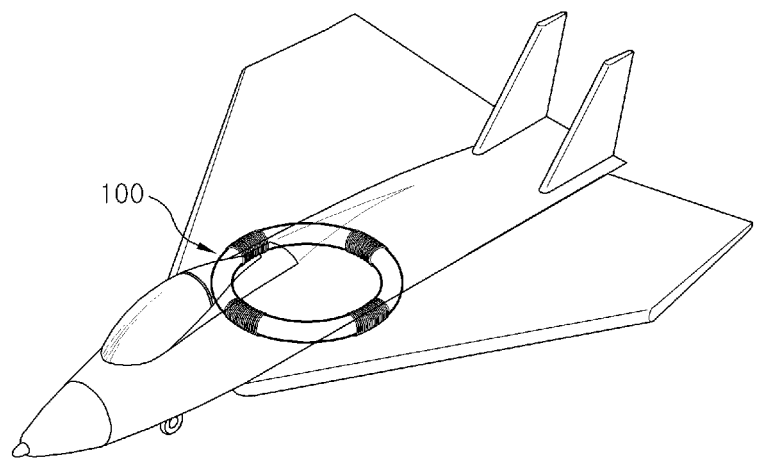
FIG. 5 illustrates a vertical take-off and landing craft that uses the gyroscope of the present invention to reliably maintain the craft body level when taking off or landing.

FIG. 5 illustrates a vertical take-off and landing craft that uses the gyroscope 100 of the present invention to reliably maintain the craft body level when taking off or landing. Devices used in aircrafts must be minimized in weight Given this, the gyroscope 100 of the present invention is suitable for being used in an aircraft, and because it has a very simple structure and is light, it is very easy to install the gyroscope 100 in the aircraft or on an outer surface thereof. FIG. 5 shows an embodiment in which the gyroscope 100 is disposed under a lower surface of the body of the vertical take-off and landing craft.

In passenger planes or light aircraft, maintaining the posture of an aircraft body level when taking off or landing is a very important factor. Particularly, when the cross-wind is strong, it may be very dangerous or impossible to take off or land an aircraft, because the craft body excessively wobbles. Furthermore, when an aircraft enters turbulent air, the craft body may excessively wobble. If the gyroscope of the present invention is installed in the craft body or wings, the aircraft can be maintained in the stable posture even under the above-stated conditions which may put the aircraft in danger or make it wobble excessively.

A helicopter is easily wobbled by the wind, and when the wind blows hard, it may be impossible to fly the helicopter. Also, the helicopter is a flight vehicle which is required to minimize its own weight. Given this, if the gyroscope of the present invention which has a simple structure and is light is installed under or on the helicopter, wobbling of the helicopter can be minimized by the balance-maintaining characteristics of the gyroscope.

To reduce wobbling of an automobile, in the conventional technique, a shock absorption device such as a spring or a shock absorber has been used. However, when the automobile moves on an uneven surface of a road, for example, when passing over a manhole cover, wobbling of the automobile is further increased. Particularly, if the surface of a road is uneven as on an unpaved road, or if the degree of unevenness of a road is excessively large as on a road having a speed bump, the automobile may wobble excessively, thus giving a person in the automobile an unpleasant feeling. Therefore, a technique of minimizing wobbling of an automobile is required.

Figure 6:
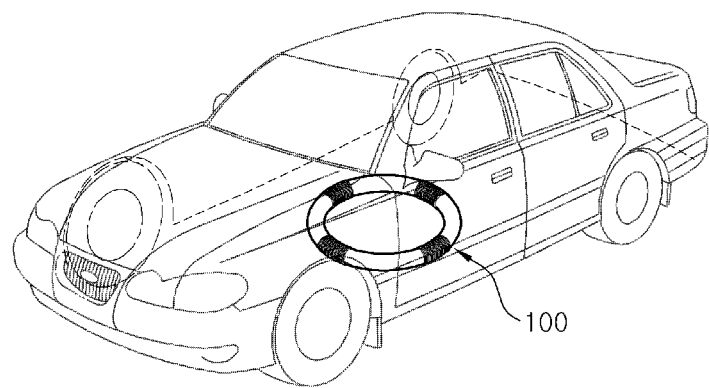
FIG. 6 illustrates an automobile that is provided with the gyroscope of the present invention.

FIG. 6 illustrates an automobile that is provided with the gyroscope 100 of the present invention. It was difficult for the conventional gyroscope to be used in an automobile, because of a large weight and volume, a complex shape and a problem of noise generation. However, since the gyroscope 100 of the present invention is comparatively small and is able to reduce noise generation, it can be easily used in an automobile.

Figure 7:
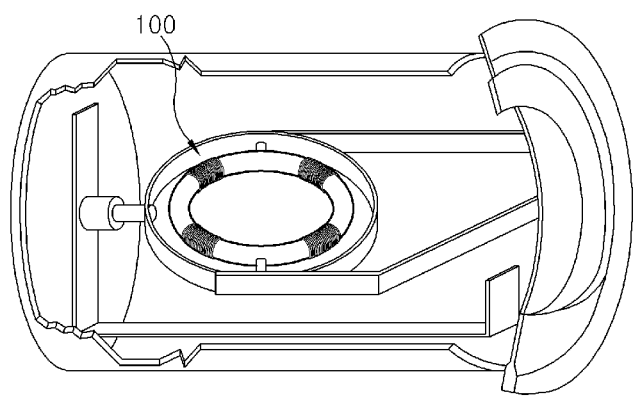
FIG. 7 illustrates an attitude indicator as an embodiment of a measuring instrument in which the gyroscope of the present invention is substituted for the conventional vacuum or motor type gyroscope.

As such, the gyroscope 100 of the present invention having the above-mentioned construction can be replaced with the conventional gyroscope which has been used in an aircraft, and it can also be used in an attitude indicator which is navigation equipment for ships. The attitude indicator indicates, using a horizontal bar, whether a device provided with the attitude indicator is maintained level with respect to front-rear and left-right directions. FIG. 7 illustrates an attitude indicator as an embodiment of a measuring instrument in which the gyroscope 100 of the present invention is substituted for the conventional vacuum or motor type gyroscope.

Meanwhile, heading indicators, turn coordinators, etc. are other examples of navigation equipment which use the gyroscope in a manner similar to that of the attitude indicator.

A heading indicator is a device combined with a magnetic compass and functions to indicate the direction in which an aircraft or ship moves. In the case of the magnetic compass, there may be an error when the aircraft wobbles excessively or is not in the level state. To prevent such a problem, the heading indicator is always used along with the magnetic compass. The heading indicator is provided to embody the above-stated function and is used to indicate the direction of the aircraft in such a way that the gyroscope is placed upright and is rotated.

A turn coordinator is a device which senses a rate of turn and a roll rate of an aircraft, and in which a gimbal is installed to be inclined so that the rotating axis of the gyroscope and a shaft of the gimbal are disposed on different planes.

Compared to the convention gyroscope, the gyroscope 100 of the present invention has a simple structure and is light, thus making it possible to reduce the size of a measuring instrument such as an attitude indicator, a heading indicator, a turn coordinator, etc. which is provided with the gyroscope 100, and increasing the degree of precision in measurement.

Furthermore, an inertia device such as the gyroscope of the present invention can be substituted for a quakeproof device or a vibration control device and may also be used on a tower of a bridge with the same purpose. Furthermore, given the fact that a long and large bridge such as a suspension bridge or a cable-stayed bridge is problematic in that the bridge deck may be vibrated or bent by external force such as a hurricane, the gyroscope of the present invention may also be used to prevent such vibration or deformation.

Although the preferred embodiment of the present invention has been disclosed for illustrative purposes, the present invention is not limited to the embodiment, and various modifications, additions and substitutions are possible, without departing from the scope and spirit of the invention.

What is claimed is:

1. A gyroscope comprising:
a rotary core having an annular shape and configured in such a way that magnetic bodies and nonmagnetic bodies are alternately arranged;
a tube casing forming an internal space therein and receiving the rotary core in the internal space;
a plurality of coils wound around an outer circumferential surface of the tube casing and disposed at positions spaced apart from each other at regular intervals;
a power supply supplying current to the coils; and
a controller controlling the power supply,
wherein the internal space of the tube casing is a vacuum,
wherein the coils surround the rotary core while being spaced apart from the rotary core so that the rotary core passes through the coils while rotating,
wherein the tube casing is surface-treated so that a friction factor of a surface of the internal space of the tube casing is reduced,
wherein the number of coils is the same as the number of magnetic bodies of the rotary core, and
wherein the number of coils is the same as the number of the nonmagnetic bodies of the rotary core.

2. The gyroscope as set forth in claim 1, wherein each of the magnetic bodies of the rotary core is made of a permanent magnet or wrought iron.

3. An aircraft having the gyroscope of claim 1 therein or on an outer surface thereof.

4. A helicopter having the gyroscope of claim 1 therein or on an outer surface thereof.

5. An automobile having the gyroscope of claim 1 therein or on an outer surface thereof.

6. A gyroscope comprising:
a rotary core having an annular shape and configured in such a way that magnetic bodies and nonmagnetic bodies are alternately arranged;
a plurality of coils wound around the rotary core with a space between each of the coils and the rotary core, the coils being disposed at positions spaced apart from each other at regular intervals;
a power supply supplying current to the coils;
a controller controlling the power supply; and
a tube casing forming an internal space therein and receiving the rotary core and the coils in the internal space,
wherein the internal space of the tube casing is a vacuum,
wherein the coils surround the rotary core while being spaced apart from the rotary core so that the rotary core passes through the coils while rotating,
wherein the tube casing is surface-treated so that a friction factor of a surface of the internal space of the tube casing is reduced,
wherein the number of coils is the same as the number of magnetic bodies of the rotary core, and
wherein the number of coils is the same as the number of the nonmagnetic bodies of the rotary core.

7. The gyroscope of claim 6, wherein each of the magnetic bodies of the rotary core is made of a permanent magnet or wrought iron.

\* \* \* \* \*